US009104352B2

(12) United States Patent
Will et al.

(10) Patent No.: US 9,104,352 B2
(45) Date of Patent: Aug. 11, 2015

(54) METHOD, APPARATUS AND SYSTEM FOR RENDERING AN OBJECT ON A PAGE

(75) Inventors: Alexander Will, Randwick (AU); Thomas Benjamin Sanjay Thomas, Seattle, WA (US); Delilah Gloria Slack-Smith, Bardwell Park (AU); Cuong Hung Robert Cao, Revesby (AU); Sheng Wu, Chatswood (AU)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 13/533,695

(22) Filed: Jun. 26, 2012

(65) Prior Publication Data

US 2013/0003085 A1   Jan. 3, 2013

(30) Foreign Application Priority Data

Jun. 29, 2011 (AU) ................................ 2011203173

(51) Int. Cl.
| | |
|---|---|
| G06K 15/00 | (2006.01) |
| G06F 3/12 | (2006.01) |
| G06T 11/60 | (2006.01) |
| G06F 15/00 | (2006.01) |

(52) U.S. Cl.
CPC ............ *G06F 3/1211* (2013.01); *G06F 3/1245* (2013.01); *G06F 3/1285* (2013.01); *G06T 11/60* (2013.01)

(58) Field of Classification Search
CPC .......... G03G 15/6585; G03G 15/5058; G06K 15/02; G06K 15/1822; G06K 2215/0085; H04N 1/32; H04N 1/387; H04N 1/34; H04N 2201/0092; G06F 3/1211; G06F 3/1245; G06F 3/1285; G06T 11/60
USPC ............. 358/1.1, 1.2, 1.5, 1.9, 2.1, 3.27, 1.18
See application file for complete search history.

(56) References Cited

U.S. PATENT DOCUMENTS

| | | | |
|---|---|---|---|
| 6,515,675 B1 | 2/2003 | Bourdev | |
| 7,209,258 B1 | 4/2007 | Markovic et al. | |
| 7,262,782 B1 | 8/2007 | Parenteau et al. | |
| 7,692,652 B2 | 4/2010 | Parenteau et al. | |
| 2004/0249730 A1* | 12/2004 | Morita et al. ................... | 705/30 |

* cited by examiner

*Primary Examiner* — Thierry L Pham
(74) *Attorney, Agent, or Firm* — Canon USA Inc. IP Division

(57) ABSTRACT

A method of rendering a graphical object (e.g., 801) on a page (800), is disclosed. A region of the page containing the graphical object (801) is marked as output incompatible based on the graphical object (801) being output incompatible. A bounding box comprising the marked region is determined. A proportion of a number of the regions marked as output incompatible are determined to a total number of regions in the bounding box. A further region within the bounding box is marked as output incompatible to increase the determined proportion above a threshold. The graphical object in the marked region and the further marked region is converted into an output compatible graphical object if the determined proportion is above the threshold. The output compatible graphical object is rendered.

4 Claims, 12 Drawing Sheets

METHOD, APPARATUS AND SYSTEM FOR RENDERING AN OBJECT ON A PAGE

REFERENCE TO RELATED PATENT APPLICATION

This application claims priority under 35 U.S.C. §119 from Australian Patent Application No. 2011203173, filed Jun. 29, 2011, which is hereby incorporated by reference in its entirety as if fully set forth herein.

FIELD OF INVENTION

The current invention relates to graphics processing and, in particular, to a method and apparatus for rendering an object on a page. The current invention also relates to a computer program product including a computer readable medium having recorded thereon a computer program for rendering an object on a page.

DESCRIPTION OF BACKGROUND ART

The printing process in modern operating systems, typically involves steps of invoking drawing functions, converting the drawing functions into a standardized format (e.g. PDF or XPS), and spooling the standardized format drawing functions to a printer driver. The printer driver may contain an interpreter which parses the standardized format drawing functions, and converts the standardized format drawing functions into drawing instructions that are accepted by a printer driver rendering engine. The printer driver rendering engine typically renders the drawing instructions to pixels, and sends the pixels to a printer which prints the pixels onto paper.

Some printers have limited rendering functionality. A printer driver used by such printers may contain an interpreter that parse the standardized format into certain printer-recognizable graphical objects and drawing instructions that are accepted by the printer. The printer driver sends the generated graphical objects and drawing instructions to the printer. The printer then renders the graphical objects and drawing instructions into pixels.

Conventional methods for converting graphical objects and drawing instructions parsed from the standardized format into limited, printer-supported graphical objects, typically include processes for translating any printer-compatible graphical objects and drawing instructions directly into a printer-recognizable format. Such methods typically also include processes for rendering any printer-incompatible graphical objects and drawing instructions into pixels. The conventional methods for converting graphical objects and drawing instructions into limited, printer-supported graphical objects may result in a large amount of image data being sent to the printer, especially when there is lots of overlap between printer-compatible objects and printer-incompatible objects. The large amount of image data often results in a slow printing speed.

Thus, a need clearly exists for a better and more efficient printing method that will result in a faster printing speed.

SUMMARY OF THE INVENTION

It is an object of the present invention to substantially overcome, or at least ameliorate, one or more disadvantages of existing arrangements.

According to one aspect of the present disclosure there is provided a method of rendering a graphical object on a page, the method including:

marking a region of the page containing the graphical object as output incompatible based on the graphical object being output incompatible;

determining a bounding box including the marked region;

determining a proportion of a number of the regions marked as output incompatible to a total number of regions in the bounding box;

marking a further region within the bounding box as output incompatible to increase the determined proportion above a threshold;

converting the graphical object in the marked region and the further marked region into an output compatible graphical object if the determined proportion is above the threshold; and rendering the output compatible graphical object.

According to another aspect of the present disclosure there is provided a method of rendering a graphical object on a page, the method including:

marking a first region of the page containing the graphical object as output incompatible based on the graphical object being output incompatible;

determining a distance of a second region from the first region;

marking the second region as output incompatible, if the determined distance satisfies a threshold;

converting graphical objects within the first and the second region as output compatible; and rendering the output compatible objects.

According to still another aspect of the present disclosure there is provided a method of rendering a graphical object on a page, the method including:

determining a size of the graphical object to be rendered on the page;

marking a region of the page as output incompatible if (a) the graphical object is output incompatible, and (b) the determined size of the graphical object is larger than a threshold;

converting the graphical object into an output compatible graphical object; and rendering the output compatible object to a renderer for rendering.

According to still another aspect of the present disclosure there is provided a system for rendering a graphical object on a page, the system including:

a memory for storing data and a computer program;

a processor coupled to the memory for executing the computer program, the computer program including instructions for:

marking a region of the page containing the graphical object as output incompatible based on the graphical object being output incompatible;

determining a bounding box including the marked region;

determining a proportion of a number of the regions marked as output incompatible to a total number of regions in the bounding box;

marking a further region within the bounding box as output incompatible to increase the determined proportion above a threshold;

converting the graphical objects in the marked region and the further marked region into an output compatible graphical object if the determined proportion is above the threshold; and rendering the output compatible graphical object.

According to still another aspect of the present disclosure there is provided a system for rendering a graphical object on a page, the system including:

a memory for storing data and a computer program;

a processor coupled to the memory for executing the computer program, the computer program including instructions for:

marking a first region of the page containing the graphical object as output incompatible based on the graphical object being output incompatible;

determining a distance of a second region from the first region;

marking the second region as output incompatible, if the determined distance satisfies a threshold;

converting graphical objects within the first and the second region as output compatible; and rendering the output compatible graphical objects.

According to still another aspect of the present disclosure there is provided an apparatus for rendering a graphical object on a page, the apparatus including:

means for marking a region of the page as output incompatible based on the mapped graphical object being output incompatible;

means for determining a bounding box including the marked region;

means for determining a proportion of a number of the regions marked as output incompatible to a total number of regions in the bounding box;

means for marking a further region within the bounding box as output incompatible to increase the determined proportion above a threshold;

means for converting the graphical object in the marked region and the further marked region into an output compatible graphical object if the determined proportion is above the threshold; and means for rendering the output compatible graphical object.

According to still another aspect of the present disclosure there is provided an apparatus for rendering a graphical object on a page, the apparatus including:

means for marking a first region of the page containing the graphical object as output incompatible based on the graphical object being output incompatible;

means for determining a distance of a second region from the first region;

means for marking the second region as output incompatible, if the determined distance satisfies a threshold;

means for converting graphical objects within the first and the second region as output compatible; and means for rendering the output compatible objects.

According to still another aspect of the present disclosure there is provided a computer readable medium having a computer program recorded thereon for rendering a graphical object on a page, the computer program including:

code for marking a region of the page containing the graphical object as output incompatible based on the graphical object being output incompatible;

code for determining a bounding box including the marked region;

code for determining a proportion of a number of the regions marked as output incompatible to a total number of regions in the bounding box;

code for marking a further region within the bounding box as output incompatible to increase the determined proportion above a threshold;

code for converting the graphical object in the marked region and the further marked region into an output compatible graphical object if the determined proportion is above the threshold; and code for rendering the output compatible graphical object.

According to still another aspect of the present disclosure there is provided a computer readable medium having a computer program recorded thereon for rendering a graphical object on a page, the computer program including:

code for marking a first region of the page containing the graphical object as output incompatible based on the graphical object being output incompatible;

code for determining a distance of a second region from the first region;

code for marking the second region as output incompatible, if the determined distance satisfies a threshold;

code for converting graphical objects within the first and the second region as output compatible; and code for rendering the output compatible objects.

Other aspects of the invention are also disclosed.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

Figure 1A:
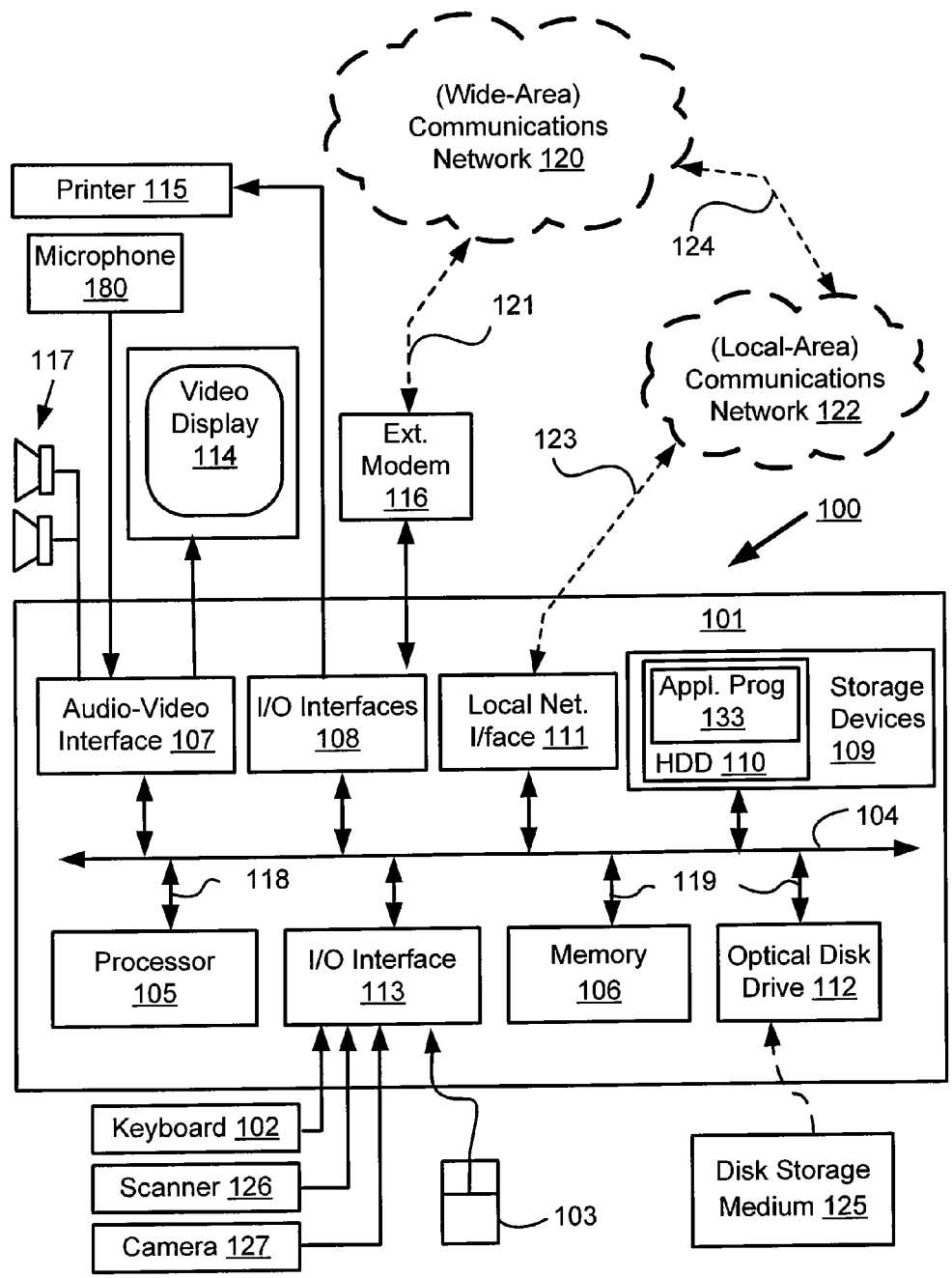
FIGS. 1A and 1B form a schematic block diagram of a general purpose computer system upon which arrangements described may be practiced.

Where reference is made in any one or more of the accompanying drawings to steps and/or features, which have the same reference numerals, those steps and/or features have for the purposes of this description the same function(s) or operation(s), unless the contrary intention appears.

A method 200 (see FIG. 2) of rendering a graphical object on a page, is described below with reference to FIGS. 1A to 9. The method 200 takes into account a compatible/incompatible property of the graphical object as well as other properties of the graphical object, such as object type and size as well as overlap.

Figure 1B:
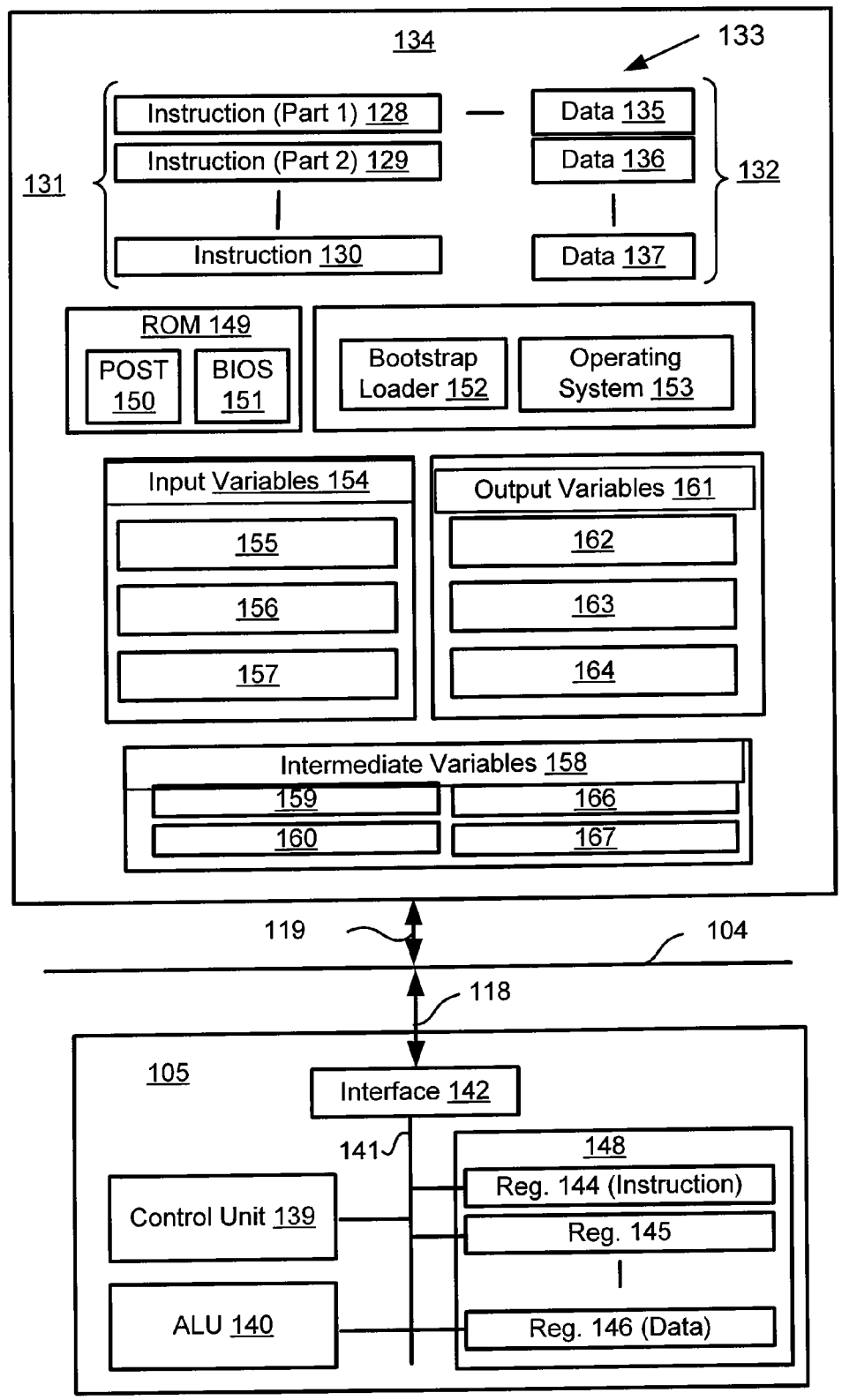

FIGS. 1A and 1B depict a general-purpose computer system 100, upon which the described methods, including the method 300, may be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

The described methods, including the method 200, may be implemented using the computer system 100 wherein the processes of FIGS. 1 to 9, to be described, may be implemented as one or more software application programs 133 executable within the computer system 100. In particular, the steps of the described method 200 are effected by instructions 131 (see FIG. 1B) in the software application program 133 that are carried out within the computer system 100. The software instructions 131 may be formed as one or more software code modules, each for performing one or more particular tasks. The software application program 133 may also be divided into two separate parts, in which a first part and the corresponding software code modules performs the described methods and a second part and the corresponding software code modules manage a user interface between the first part and the user.

The software application program 133 may be stored in a computer readable medium, including the storage devices described below, for example. The software application program 133 is loaded into the computer system 100 from the computer readable medium, and is then executed by the computer system 100. A computer readable medium having such software or computer program recorded on the computer readable medium is a computer program product. The use of the computer program product in the computer system 100 preferably effects an advantageous apparatus for implementing the described methods.

The software application program 133 is typically stored in the HDD 110 or the memory 106. The software application program 133 is loaded into the computer system 100 from a computer readable medium, and executed by the computer system 100. Thus, for example, the software application program 133 may be stored on an optically readable disk storage medium (e.g., CD-ROM) 125 that is read by the optical disk drive 112.

In some instances, the software application program 133 may be supplied to the user encoded on one or more CD-ROMs 125 and read via the corresponding drive 112, or alternatively may be read by the user from the networks 120 or 122. Still further, the software application program 133 can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the software application program 133 and the corresponding software code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 1100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The software application program 133 includes a sequence of instructions 131 that may include conditional branch and loop instructions. The software application program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The described methods use input variables 154, which are stored in the memory 134 in corresponding memory locations 155, 156, 157. The methods produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 1 to 9 is associated with one or more segments of the software application program 133 and is performed by the register section 144, 145, 147, the ALU 140, and the control unit 139 in the processor 105 working together to perform the fetch, decode, and execute cycles for every instruction in the instruction set for the noted segments of the software application program 133.

The method 300 may alternatively be implemented in dedicated hardware such as one or more integrated circuits performing the functions or sub functions of the method 300. Such dedicated hardware may include graphic processors, digital signal processors, or one or more microprocessors and associated memories.

Figure 2:
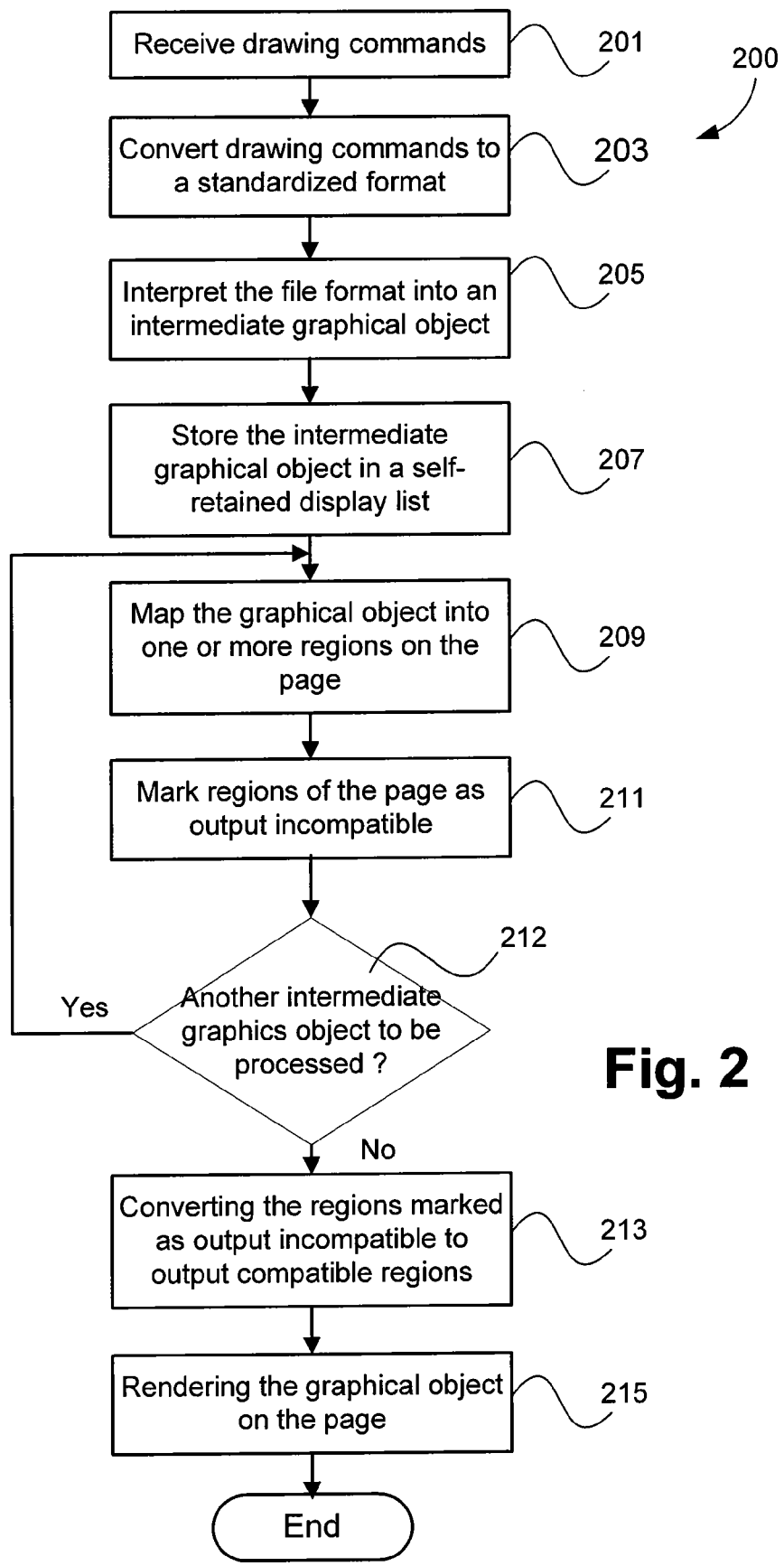
FIG. 2 is a schematic flow diagram showing a method of rendering a graphical object on a page.

The method 200 of rendering a graphical object on a page will now be described with reference to FIG. 2. The method 200 may be implemented as one or more software code modules of the software application program 133 resident on the hard disk drive 110 and being controlled in its execution by the processor 105.

The method 200 begins at drawing command receiving step 201, where the processor 105 receives one or more drawing commands which may be stored in memory 106. The drawing commands may be issued by another software application program resident on the hard disk drive 110 and being controlled by the processor 105. Alternatively, the drawing commands may be issued by a software application program resident on a remote server connected to the network 120.

In one implementation, the drawing commands may be issued to an operating system spooler software module, using an operating system supplied graphics application programming interface. Such an operating system spooler software module may be resident on the hard disk drive 110 and be controlled in its execution by the processor 105. At converting step 203, the processor 105 (or the operating system spooler software module under execution of the processor 105) converts the drawing commands to a standardized file format such as the XPS file format or the Portable Document Format (PDF).

Then, at interpreting step 205, the standardized file format is interpreted into an intermediate graphical object. The intermediate graphical object contains corresponding drawing instructions of how to draw the graphical object onto the page, including graphics properties of the graphical object, such as shape, compositing method, clipping information and possibly a bounding box. In one implementation, step 205 may be executed by a printer driver software module resident on the hard disk drive 110 and being controlled in its execution by the processor 105.

At storing step 207, the intermediate graphical object and corresponding drawing instructions are stored in a self-retained display list (SRDL) configured within the memory 106. The self-retained display list is an internal display list that is constructed and used for converting the intermediate graphical object into printer-recognizable format. In one implementation, step 207 and following steps 209 to 213 may be executed by an object converter software module resident in the hard disk drive 110 and being controlled in its execution by the processor 105. As described below, in steps 207 to 213 the intermediate graphical objects are converted into printer-compatible graphical objects in printer-recognizable format.

Then at mapping step 209, the processor 105 performs the step of mapping the intermediate graphical object onto one or more corresponding regions of the page. In performing the mapping at step 209, the processor 105 determines which regions of the page are touched by the graphical object. A method 400 of mapping the intermediate graphical object onto one or more corresponding regions of the page, as executed at step 209, will be described in detail below with reference to FIG. 4.

At marking step 211, the processor 105 performs the step of marking the corresponding regions of the page as output incompatible based on the mapped graphical object being output incompatible, and any surrounding regions being classified as output incompatible (i.e., associated with a corresponding output incompatible graphical object). In one implementation, the corresponding regions of the page are marked as output incompatible based on a determined size of the graphical object satisfying a threshold as described below.

Each region of the page has a bounding box and an associated "dirty status" flag. The dirty status flag is used for marking the corresponding region so as to indicate if the graphical object corresponding to the region is output incompatible (i.e., dirty) and needs to be converted to output compatible in following step 213. A method 300 of marking one or more regions of the page as output incompatible, as executed at step 211, will be described below with reference to FIG. 3.

Then at deciding step 212, if the processor 105 determines that there is a further intermediate graphical object to be processed (e.g., the printer driver software module has interpreted a further intermediate graphical object in the standardized file format), then the method 200 returns to step 209 to process the further intermediate graphical object. Otherwise, the method 200 proceeds to converting step 213. The further intermediate graphical object is stored in the self-retained display list (SRDL) configured within the memory 106.

At converting step 213, the processor 105 performs the step of converting the regions marked as output incompatible (i.e., as dirty) to output compatible regions. As described in detail below, at step 213, the processor 105 processes the dirty status flags of the regions and converts the dirty regions into printer-compatible graphical objects. A method 500 of converting regions marked as output incompatible to output compatible regions, as executed at step 213, will be described in detail below with reference to FIG. 5.

At rendering step 215, the processor 105 performs the step of rendering the graphical object on the page using any corresponding output compatible regions. In one implementation, the processor 105 may pass the printer-compatible graphical object, together with corresponding drawing instructions, to a rendering engine software module residing on the printer 115. Such a rendering engine renders the printer-recognizable graphical object into pixels, and prints the pixels onto the page.

Figure 4:
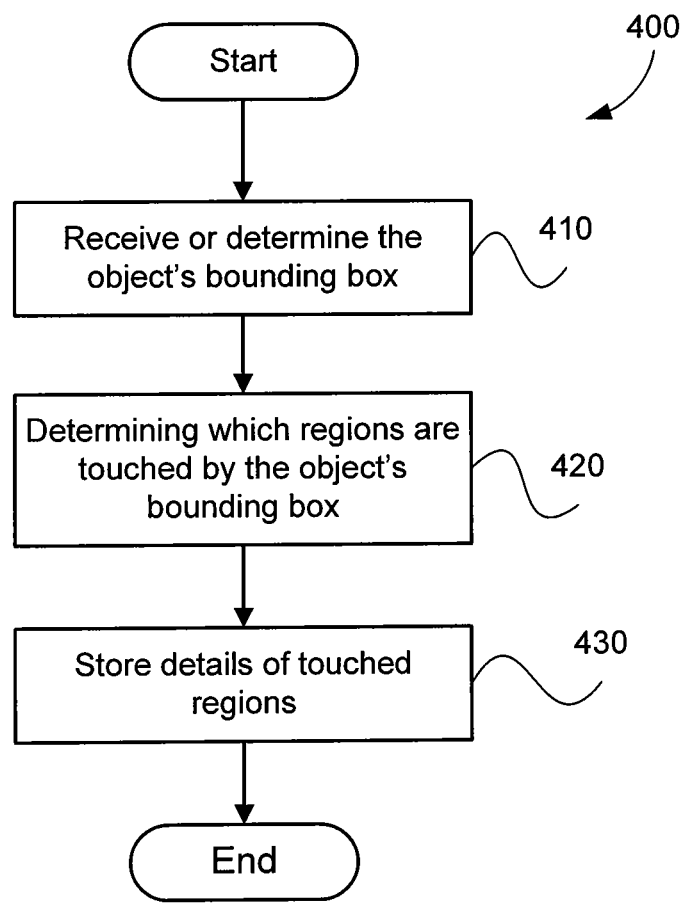
FIG. 4 is a schematic flow diagram showing a method of mapping a graphical object onto one or more corresponding regions of a page, as used in the method of FIG. 2.

The method 400 of mapping the intermediate graphical object onto one or more corresponding regions of the page, as executed at step 209, will now be described with reference to FIG. 4. In the method 400, an intermediate graphical object is mapped onto corresponding regions of the page. Each region has a bounding box and an associated dirty status flag as described above. The method 400 may be implemented as one or more software code modules of the software application program 133 resident on the hard disk drive 110 and being controlled in its execution by the processor 105. As described above, in one implementation, the method 400 may be executed by the object converter software module.

At step 410, the processor 105 receives a bounding box of the intermediate graphical object, if the bounding box is provided in graphics properties associated with the intermediate graphical object. If the bounding box is not provided with the graphical object, then the processor 105 determines a bounding box using shape and clipping information provided with graphics properties of the graphical object.

At step 420, the processor 105 uses the bounding box of the graphical object to determine which regions of the page are touched by the graphical object. In particular, the processor 105 determines intersections between the bounding box of the graphical object and bounding boxes of each of the regions. If intersections are determined, then the region is determined to be touched by the graphical object.

At step 430, the processor 105 stores details of the determined touched regions within the memory 106.

Figure 3:
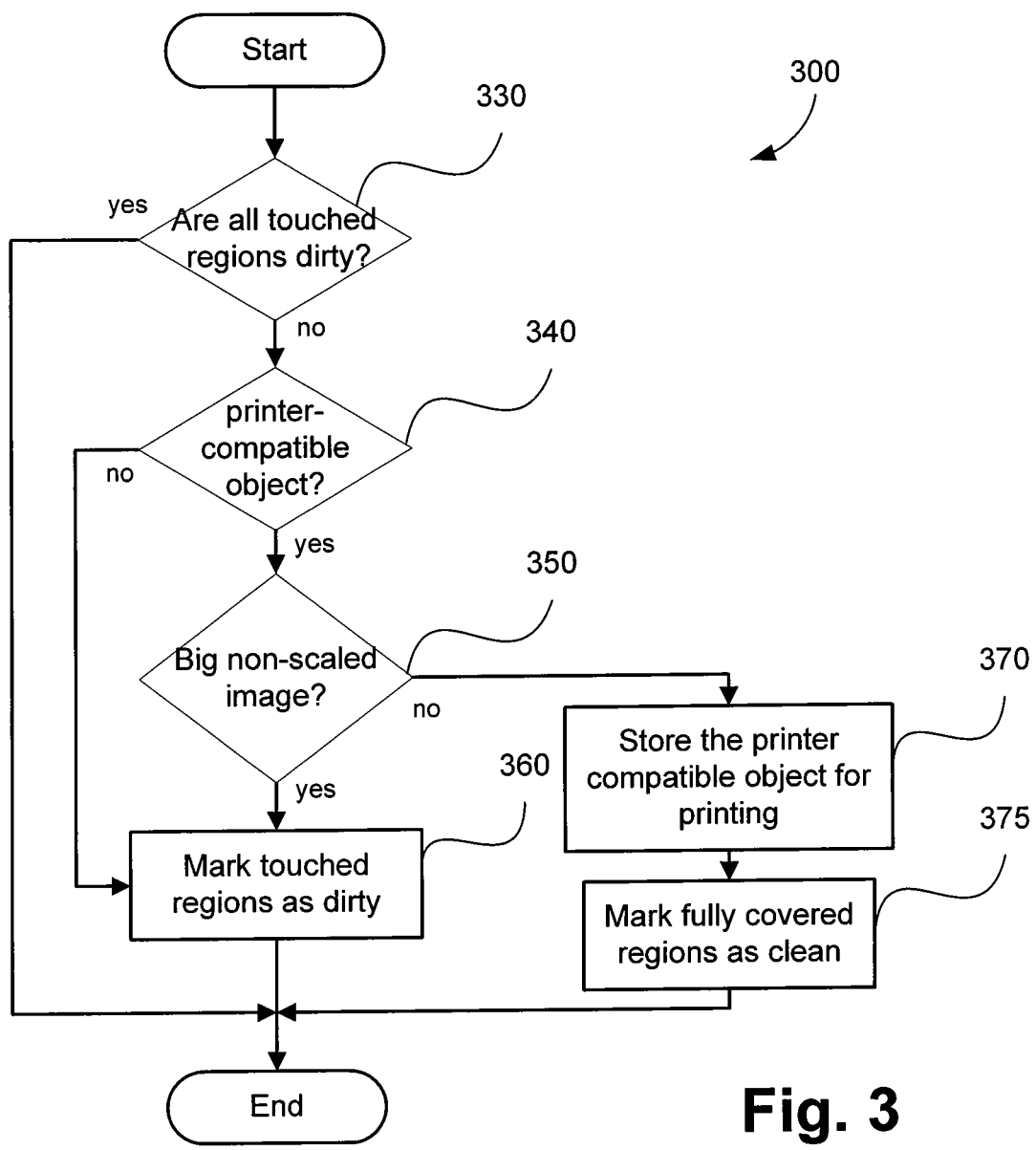
FIG. 3 is a schematic flow diagram showing a method of marking one or more regions of the page as output incompatible, as used in the method of FIG. 2.

The method 300 of marking one or more regions of the page as output incompatible, as executed at step 211 of the method 200, will now be described below with reference to FIG. 3. In the method 300, the intermediate graphical objects parsed from standardised format and stored in the self-retained display list are converted to printer-compatible graphical objects. The page is divided into grids of a pre-determined size. Each grid is a region as described above.

The method 300 may be implemented as one or more software modules of the software application program 133 and being controlled in its execution by the processor 105.

The method 300 begins at dirty region determining step 330, where if the processor 105 determines that all the regions of the page that are touched by the intermediate graphical object have an associated "dirty" status flag, then the method 300 concludes. Otherwise, the method 300 proceeds to step 340.

A region that is marked as "dirty" means that the graphical object corresponding to the region is output incompatible (i.e., the graphical object is not in a format recognizable to the printer 115) and needs to be converted into a printer-compatible graphical object. If all the touched regions already have the dirty flag on, then the method 300 skips further processing of the intermediate graphical object.

At printer-compatible determining step 340, the processor 105 checks all graphics properties of the received intermediate graphical object, including corresponding drawing instructions used to draw the graphical object onto the page, the compositing method and the clipping information. If the processor 105 determines at step 340 that there are any graphics properties of the graphical object that are not compatible with the printer-recognizable format used by the printer 115 (i.e., the graphical object is not printer compatible), then the current graphical object is considered as a printer-incompatible object and the method 300 proceeds to marking step 360. Otherwise, the method 300 proceeds to step 350.

At marking step 360, the processor 105 performs the step of marking the touched regions by setting the dirty flag associated with each of the touched regions to be TRUE; and the processor 105 skips further processing of the current intermediate graphical object.

If all graphics properties of the current intermediate graphical object are printer-compatible at step 340, then the current graphical object is classified as a printer-compatible object and the method 300 proceeds to image determining step 350.

At image determining step 350, if the processor 105 determines that the current intermediate graphical object is a larger than a pre-determined threshold, opaque image, that is not going to be scaled up too much on the page to be printed, then the method 300 proceeds to step 360. Otherwise, the method 300 proceeds to storing step 370.

A maximum threshold of scaling factor of the images, big_image_max_scaled_factor, and a minimum threshold of the image size, big_image_min_image_size, may be configured within the memory 106. Accordingly, if the current graphical object is an opaque image that is larger than the big_image_min_image_size threshold and has a scaling factor less than the big_image_max_scaled_factor threshold, then all regions touched by the current graphical object are marked as dirty at step 360.

At storing step 370, the intermediate graphical object is stored within the memory 106 for printing by the rendering engine, for example, in a printer-recognizable format.

At step 375, the processor 105 determines if there are any regions of the page that are fully covered by the current printer-compatible graphical object. Depending on the graphics properties of the graphical object, including the clipping information, if a region is fully covered by the graphical object then all previous contents in the region will not be shown on the printed page. The processor 105 marks such a region as output compatible at step 375 by setting the dirty status flag of such a region to FALSE. The method 300 concludes following step 375.

Figure 5:
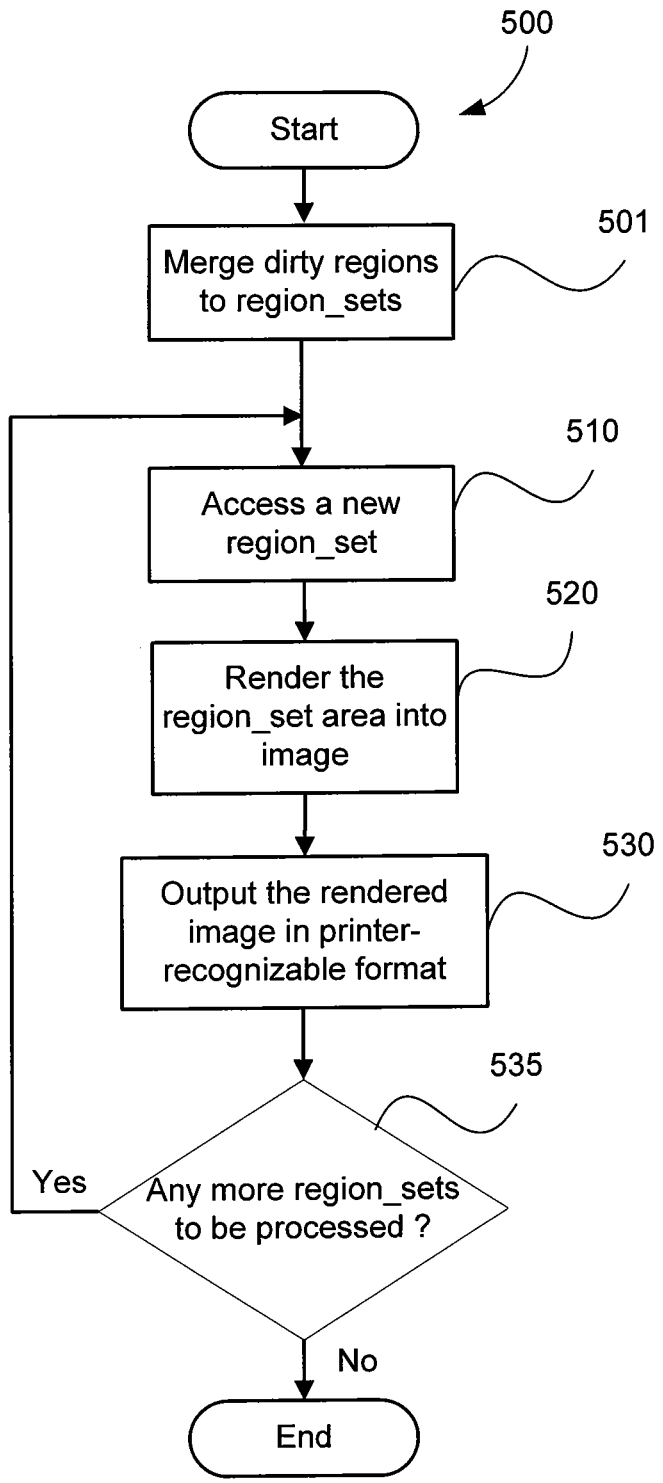
FIG. 5 is a schematic flow diagram showing a method of converting regions marked as output incompatible to output compatible regions, as used in the method of FIG. 1.

The method 500 of converting regions, marked as output incompatible, to output compatible regions, will be described in detail below with reference to FIG. 5. The method 500 processes the dirty status of all regions of the page, and converts the dirty regions into printer-compatible graphical objects.

The method 500 may be implemented as one or more software code modules of the software application program 133 resident on the hard disk drive 110 and being controlled in its execution by the processor 105. As described above, in one implementation, the method 500 may be executed by the object converter software module.

The method 500 begins at bounding box determining step 501, where the processor 105 performs the step of determining bounding boxes each comprising a plurality of regions marked as output incompatible (i.e., the dirty regions). In particular, the processor 105 processes the dirty regions, marked in accordance with the method 300, and merges the dirty regions into groups of "region_sets". The groups of region_sets are stored within the memory 106.

Figure 6:
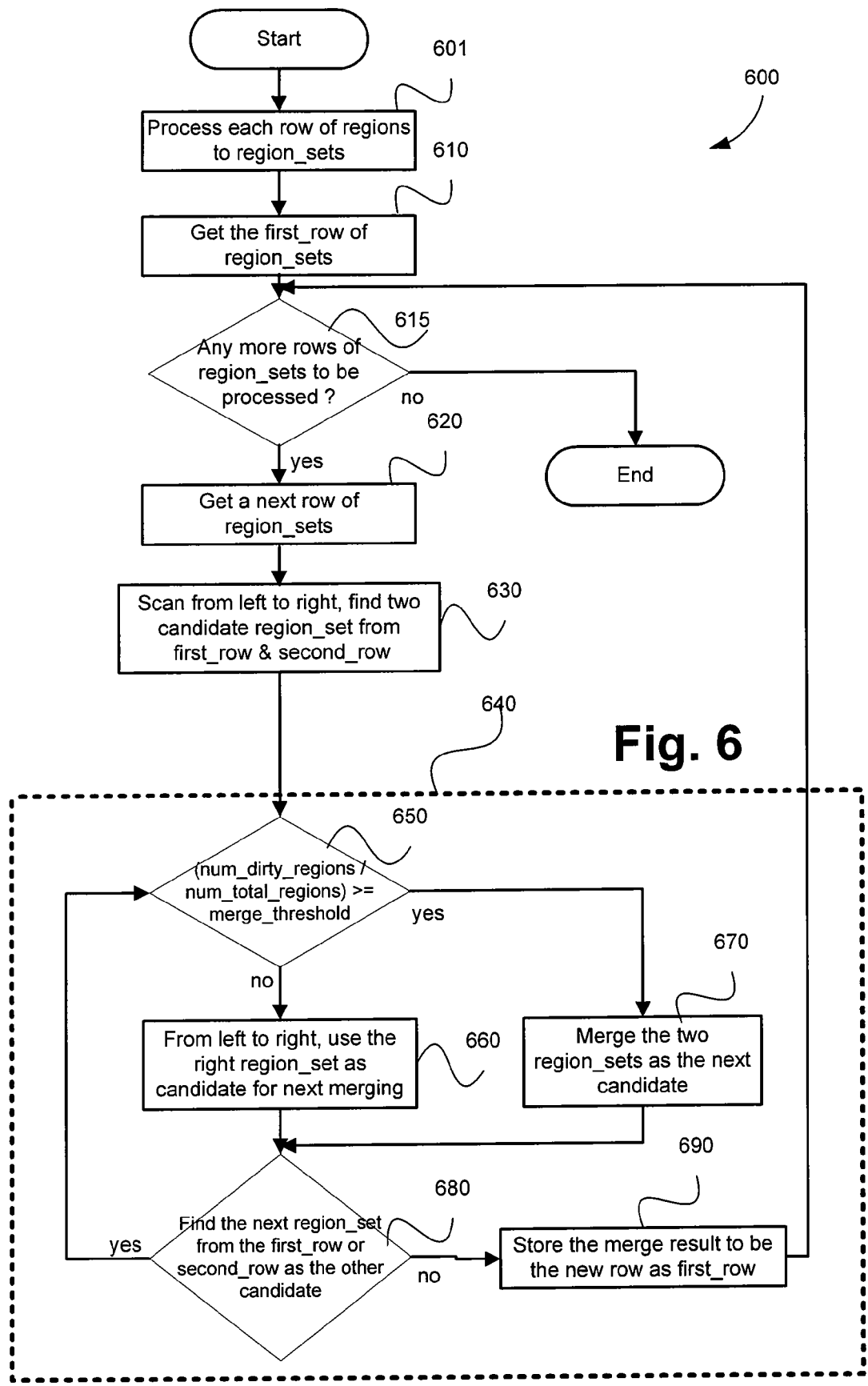
FIG. 6 is a schematic flow diagram showing a method of merging regions of the page to be printed into groups, as used in the method of FIG. 5.

A method 600 of merging regions into groups of region_sets, as executed at step 501, will be described below with reference to FIG. 6. In the method 600, the processor 105 scans regions horizontally, starting at a first row of dirty tiles. In particular, starting at a left-most dirty tile of the first row, the processor 105 attempts to merge an adjacent tile to the right of the left-most dirty tile. Merging of the tiles succeeds if the adjacent tile on the right is dirty. However, if the adjacent tile is not dirty, then the merging of the tiles may fail, depending on an area threshold as described below. The method 600 determines a set of one or more dirty tile regions for the first row. After completing processing of the first row of dirty tiles, the processor 105 horizontally scans and merges a second row of dirty tiles in a similar manner.

After completing processing of the second row of dirty tiles, the processor 105 attempts to merge the set of dirty tiles from the first and second rows, again applying an area threshold to determine whether or not to carry out the merge. The result of merging the set of dirty tiles from the first and second rows is a set of one or more dirty tile regions. Processing then continues in a similar manner for each subsequent row of dirty tiles. At completion of processing of each row, a set of dirty tile regions (i.e., a region_set) in the processed row is merged with a previous combined set of dirty tile regions.

In one implementation, the processor 105 attempts to merge the set of dirty tiles from the first and the second rows, by determining a distance between the first and the second rows. If the distance satisfies a predetermined distance threshold, the result of merging the set of dirty tiles is a set of one or more dirty tile regions. Processing then continues in a similar manner for each subsequent row of dirty tiles. At completion of processing of each row, a set of dirty tile regions (i.e., a region_set) in the processed row is merged with a previously combined set of dirty tile regions.

Each region_set contains a group of regions of the page that forms a rectangle shape, and a bounding box of a region_set is determined by co-ordinates, (start_x, start_y), of a top left region of the page, and co-ordinates, (end_x, end_y), of a bottom right region of the page. Each region_set also contains information of how many regions of the page in total the region_set contains (i.e., "num_total_regions") and out of which how many regions are dirty regions (i.e., "num_dirty_regions"). Accordingly, at step 501, the processor 105 also performs the step of determining a proportion of the number of output incompatible regions to total number of regions in the bounding box for a corresponding region_set.

At accessing step 510, the processor 105 accesses a region_set from the memory 106. Then at rendering step 520, the processor 105 renders an image representing an area indicated by the accessed region_set, using information stored in the self-retained display list configured within the memory 106. As described above, the self-retained display list contains the intermediate graphical objects and corresponding drawing instructions. The rendered image of the region_set may be stored within the memory 106 and contains all graphical objects in the corresponding area.

At converting step 530, the processor 105 converts the rendered image into the printer-recognizable format corresponding to the printer 115. In one implementation, the printer-recognizable formatted image is output to the rendering engine software module as described above. Then at decision step 535, if the processor 105 determines that there are more region_sets within memory 106 for processing, then the method 500 proceeds to step 510 to get a next region_set. Otherwise, the method 500 concludes.

The method 600 of merging regions into groups of region_sets, as executed at step 501, will be described below with reference to FIG. 6. The method 600 may be implemented as one or more software code modules of the software application program 133 resident on the hard disk drive 110 and being controlled in its execution by the processor 105. As described above, in one implementation, the method 600 may be executed by the object converter software module.

As described in detail below, in the method 600, the processor 105 marks at least one output compatible region in the particular bounding box for a region_set as output incompatible in order to increase the proportion of the number of the output incompatible regions to a total number of regions above a threshold (i.e, a predefined merge_threshold). Once the proportion of the number of regions marked as output incompatible reaches a threshold, the region in the bounding box is merged by processor 105.

In another implementation, if a region_set is within a predefined distance from another region_set, then both the region_sets are merged.

In the method 600, all dirty regions (ie., regions associated with a printer incompatible graphical object) marked in accordance with the method 300 are merged into a group of region_sets.

The method 600 begins at processing step 601, where the processor 105 processes each row of the regions to form a group of region_sets. A method 700 of processing each row of regions, as executed at step 601, will be described below with reference to FIG. 7. In the following steps 610 to 690, the dirty regions in each row are merged into a group of region_sets, where each region_set is also a shape of rectangle area. Each region_set also contains a group of regions including dirty and clean regions.

At first row accessing step 610, the processor 105 accesses a first row of the region_sets stored in memory 106. Then at decision step 615, if the processor 105 determines that there are no more rows of the region_sets to be processed, then the method 600 concludes. Otherwise, the method 600 proceeds to next row accessing step 620.

At further row accessing step 620, the processor 105 accesses a second row of the region_sets. At scanning step 630, after accessing a first_row and a second_row of the region_sets, the processor 105 scans from left to right, finding a candidate region_set from each row to form the first two candidate region_sets. As each region_set has a bounding box represented by the (start_x, start_y) co-ordinate and the (end_x, end_y) co-ordinate, the candidate region_set is determined based on the start_x co-ordinate of the region_set. The candidate region_set with the smallest start_x co-ordinate is selected for each row.

At merging step 640, the processor 105 merges the two candidate region_sets from the first_row and second_row to form a merged region_set by executing the comparison step 650. If the two region_sets are merged, the merged region_set is a new rectangle shape of regions. The new rectangle shape of regions has a bounding box determined by the (min_x, min_y) and (max_x, max_y) co-ordinates, where the min_x and min_y represents minimum X and minimum Y values, respectively, from the bounding boxes of the two candidate region_sets, and max_x and max_y represents maximum X and minimum Y values from the bounding boxes of the two candidate region_sets.

The merged region_set formed at step 640 contains all regions contained in the two candidate region_sets, as well as all the clean regions in between the two candidate region_sets to form a new rectangle shape of regions. The num_total_regions and num_dirty_regions, configured within the memory 106, for the new rectangle shape are also updated.

As part of the merging step 640, in comparing step 650, if the processor 105 determines that the ratio of the "dirty region" (region marked as output incompatible) to the total number of regions is greater than or equal to a predefined threshold that initiates merging merge_threshold, then the method 600 proceeds to step 670. Otherwise, the attempted merging is deemed to have failed and the method 600 proceeds to step 660.

At merging step 670, the merged region_set is stored within the memory 106 as one of two next candidate region_sets. At step 660, the candidate region_set with the larger start_x co-ordinate is stored in memory 106 as one of two next candidate region_sets.

At determining step 680, if the processor 105 finds the other next candidate region_set based on the start_x co-ordinate from the first_row and second_row of the region_sets stored in the memory 106, then the method 600 returns to step 640 to repeat the attempted merging steps, until all region_sets from both the first_row and the second row are processed. Otherwise, the method 600 proceeds to step 690. Again the region_set with the smallest start_x co-ordinate is selected at step 680.

At step 690, the processor 105 finishes processing all region_sets from the first_row and the second_row of region_sets. The result merged region_sets are stored within the memory 106 as a new row of region_sets, which will be the first_row of the next round of processing. Then the method 600 repeats the steps from step 620, where a second_row of region_sets is selected and merged with the first_row of region_sets.

Figure 7:
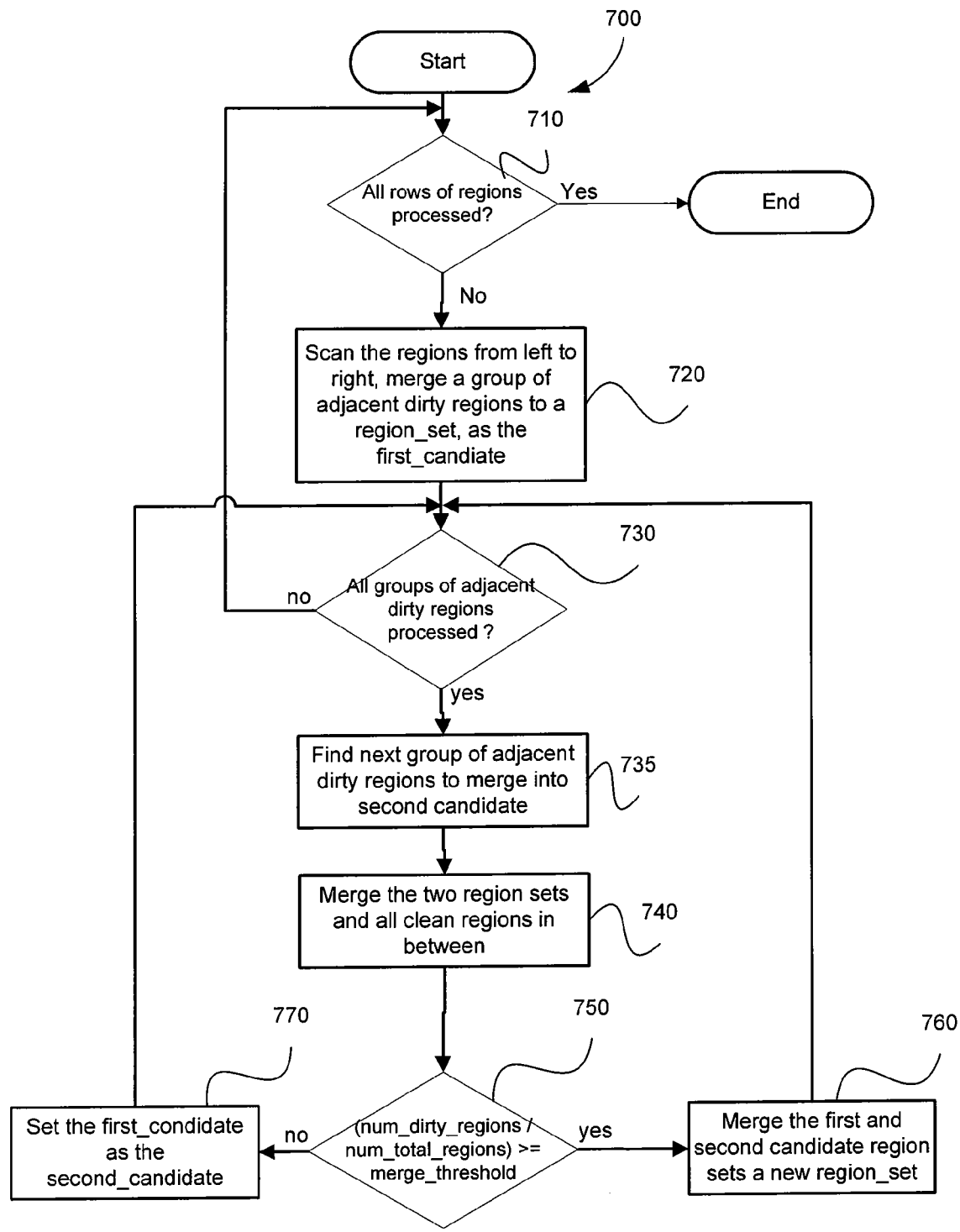
FIG. 7 is a schematic flow diagram showing a method of processing each row of regions to be merged, as used in the method of FIG. 6.

The method 700 of processing each row of regions, as executed at step 601, will now be described with reference to FIG. 7. The method 700 may be implemented as one or more software code modules of the software application program 133 resident on the hard disk drive 110 and being controlled in its execution by the processor 105. As described above, in one implementation, the method 700 may be executed by the object converter software module.

The method 700 processes each row of regions of the page stored in the memory and merges the dirty regions in each row (i.e., as marked in accordance with the method 300) into a group of region_sets.

The method 700 begins at determining step 710, where a new row of unprocessed regions stored in the memory 106 is selected by the processor 105 as a current row. Otherwise, if the processor 105 determines at step 710 that all rows of the regions stored in the memory 106 are processed, then the method 700 concludes.

At scanning step 720, the processor 105 scans the regions selected at step 710 for the current row from left to right. The processor 105 selects a first dirty region and all adjacent dirty regions following the first dirty region, and merges the first dirty region and all adjacent dirty regions into a merged region_set. The bounding box of the merged region_set is determined based on the (start_x, start_y) co-ordinate of the first dirty region and the (end_x, end_y) co-ordinate of the last adjacent dirty region. Both num_total_regions and num_ dirty_regions are equal to the total number of the adjacent dirty regions merged together at step 720. The merged region_ set is stored in memory 106 as the first_candidate region_set.

At decision step 730, if the processor 105 determines that all groups of adjacent dirty regions have been processed for the current row, then the method 700 proceeds to step 735. Otherwise, the method 700 returns to step 710.

At merging step 735, the processor 105 merges a next group of adjacent dirty regions into a new region_set. The new region_set is stored in the memory 106 as the second_candidate region_set. Then at step 740, the processor 105 tries to merge the first_candidate and second_candidate region_ sets and all the clean regions in between the first_candidate and second_candidate region_sets. By merging the first_candidate and second_candidate region_sets, the merged region_ set is a new rectangle shape of regions whose bounding box is determined by the (min_x, min_y), (max_x, max_y) co-ordinates, where the min_x and min_y are the minimum X and Y value from the bounding boxes of the two candidate region_ sets, and max_x and max_y are the maximum X and Y value from the bounding boxes of the two candidate region_ sets.

The merged region_set formed at step 740 contains all regions that were contained in the first and second candidate region_sets, as well as all the clean regions in between the first and second candidate region_sets to form a new rectangle shape of regions. The num_dirty_regions of the merged region_set equals the num_dirty_regions of the first_candidate region_set plus the num_dirty_regions of the second_candidate region_set. The num_total_regions of the merged region_set equals the num_total_regions of the first_candidate region set plus the num_total_regions of the second_candidate region_set plus the number of the clean regions in between the first_candidate region_set and the second_candidate region_set.

At decision step 750, if the processor 105 determines that the ratio of number of "dirty region" (region marked as output incompatible) to the total number of regions in the merged region_set is greater than or equal to a predefined threshold that initiates merging merge_threshold then the method 700 proceeds to step 760. Otherwise, the method 700 proceeds to step 770.

In one implementation, at decision step 750, if the processor 105 determines that the distance between the clean region and a region marked as dirty (containing output incompatible graphical objects) satisfies a predefined threshold (e.g., fifty (50) pixels), the clean region is marked as dirty as well. The marking of the clean region as a dirty region initiates the merging process in merging step 760. Otherwise, the method 700 proceeds to step 770.

At step 760, the merged region_set is stored in the memory 106 as a new region_set in the current row as the first_candidate region_set. Otherwise, the second_candidate region_set is stored in the memory 106 as the first_candidate region_set of a next round at storing step 770.

Following steps 760 and 770, the method 700 returns to step 730 and processing steps are repeated from step 735, until there are no more dirty regions to be found in the current row. The next row of regions are then processed from step 710 as described above. When all rows of regions are processed, the method 700 concludes as described above.

The methods described above will now be described further by way of example with reference to FIGS. 8A to 9. In accordance with the example, intermediate graphical objects 801, 802, 803, 804, 805, 806, 807, 808, 809, 810, 811, 812, 813 of the page 800 are converted to printer-compatible graphical objects in accordance with the described methods.

Figure 8A:
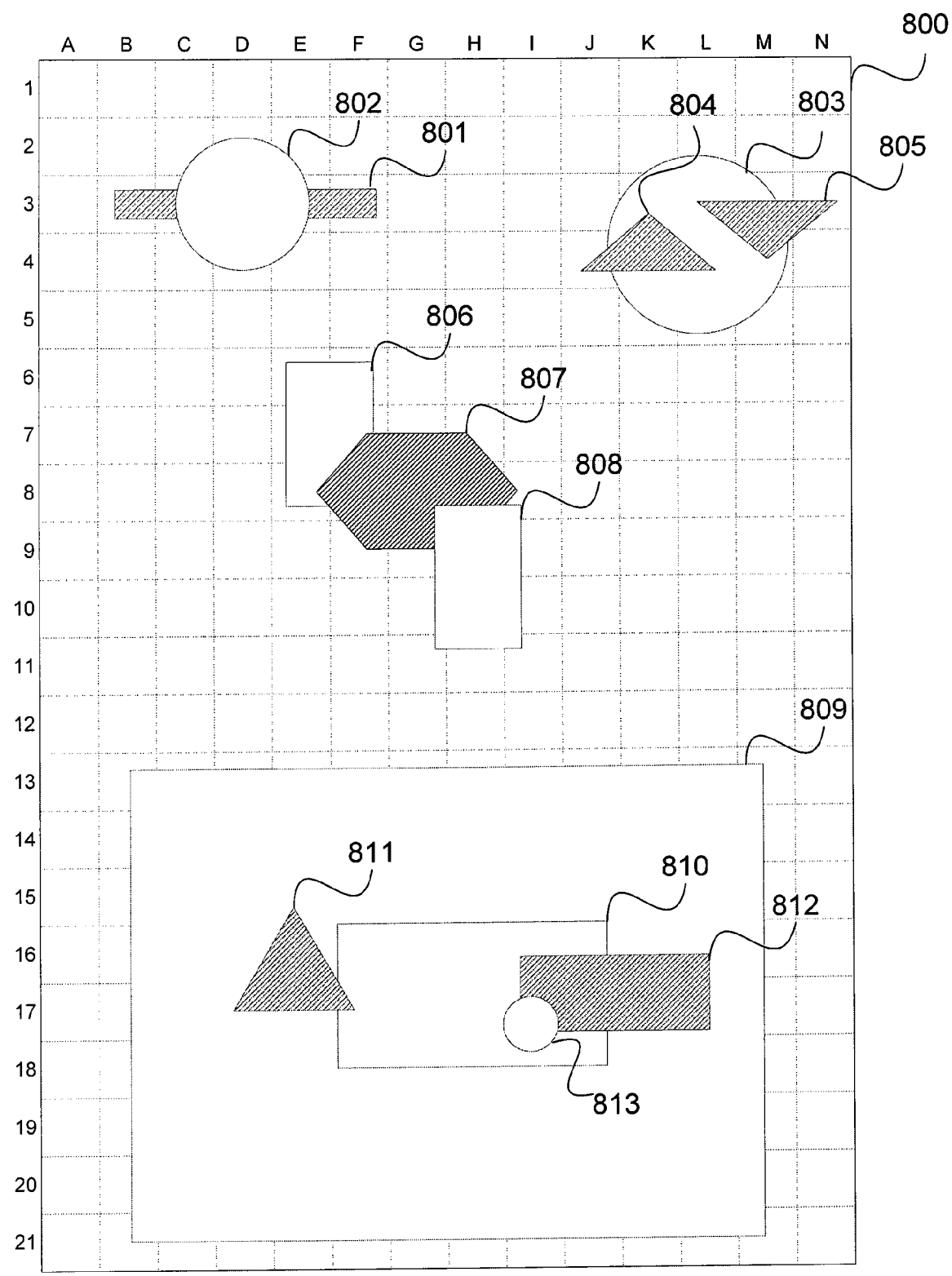
FIG. 8A shows an example page which contains several graphical objects to be printed.
Figure 8B:
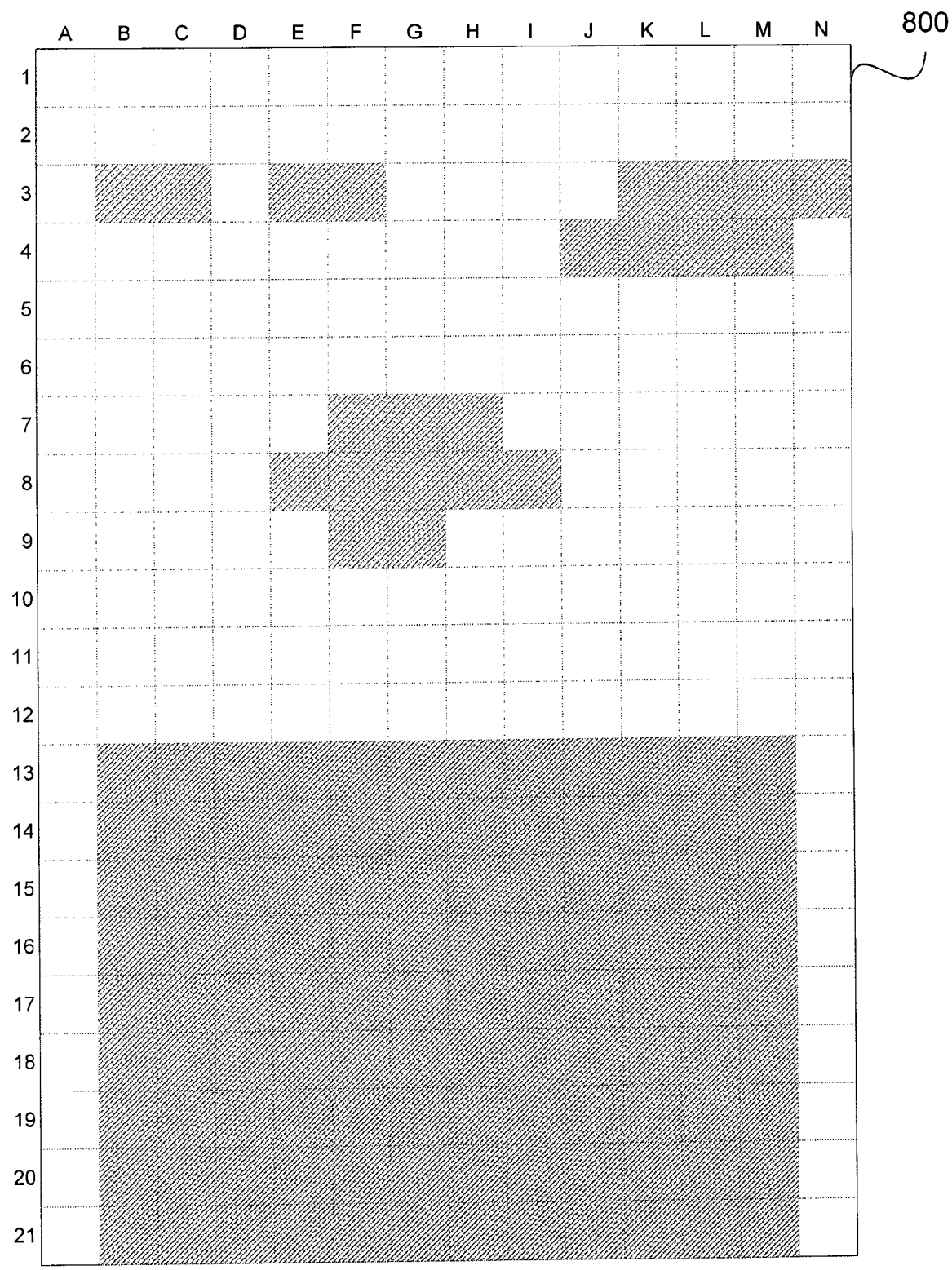
FIG. 8B shows the result of the example in FIG. 8A, after the method of FIG. 7 has been performed on the page of FIG. 8A.
Figure 8C:
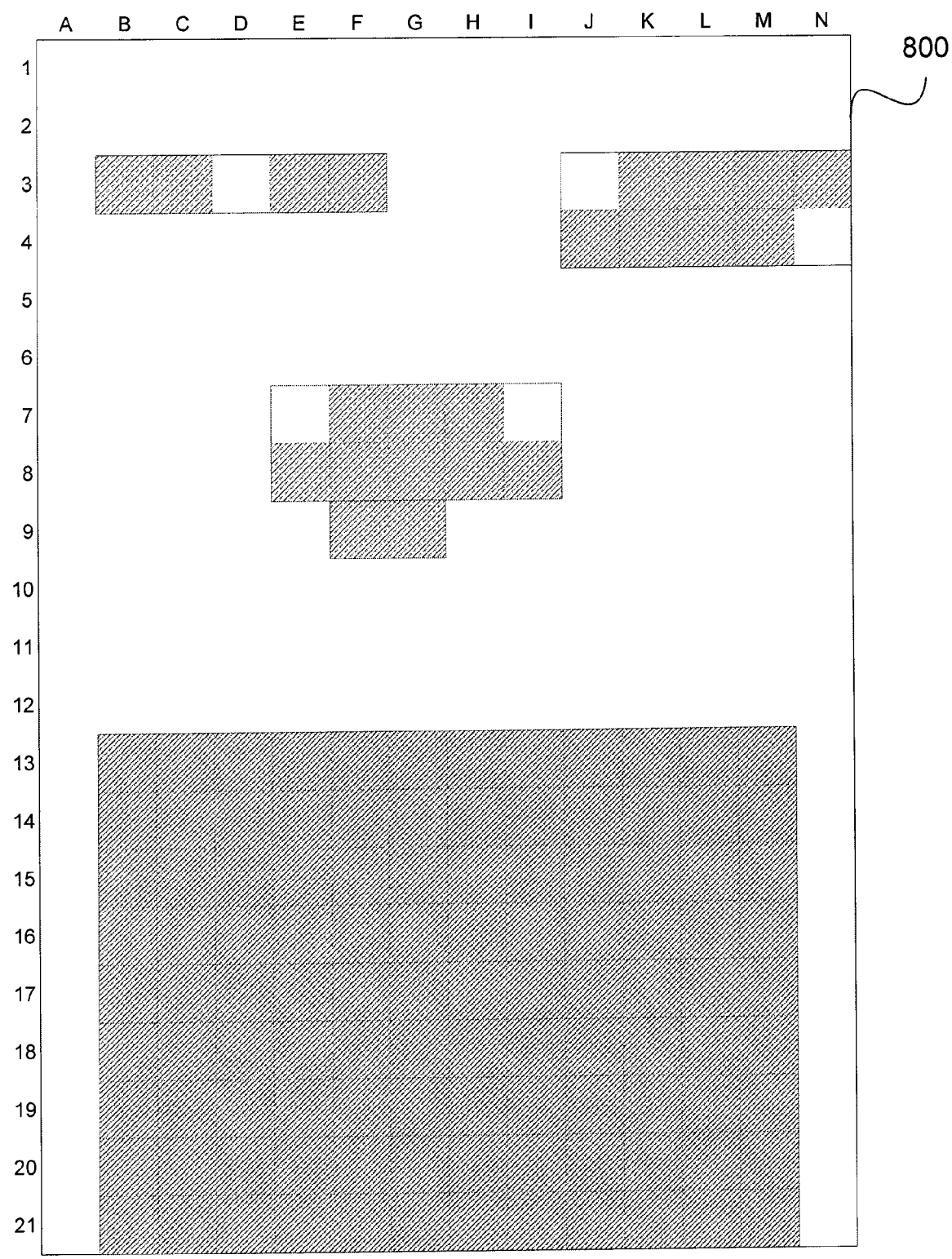
FIG. 8C shows the result of the example in FIG. 8B, after the method of FIG. 6 has been performed on the page of FIG. 8A.
Figure 9:
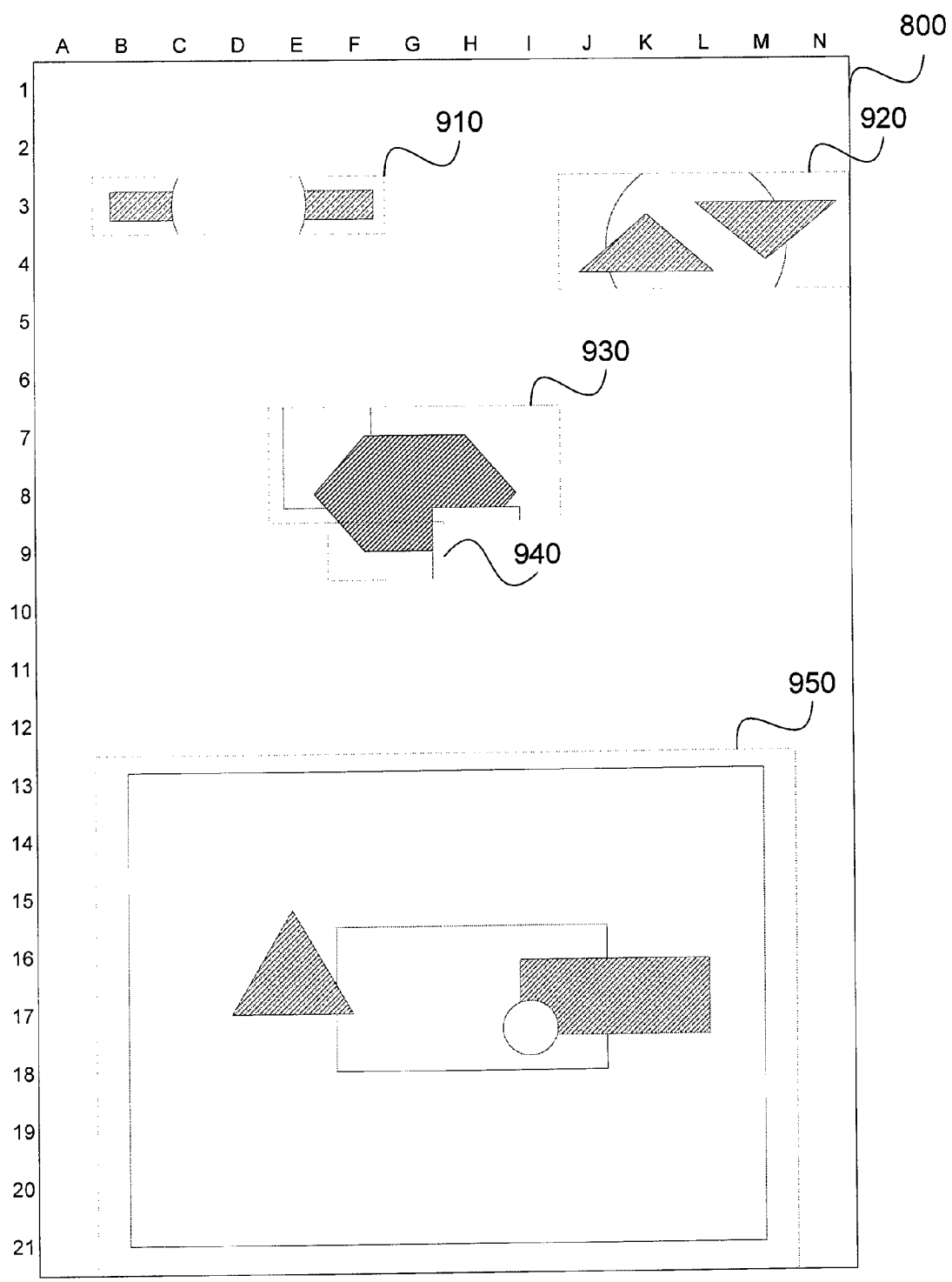
FIG. 9 shows the result of the example in FIG. 8A, after the method of FIG. 5 has been performed on the page of FIG. 8A.

In the example of FIGS. 8A to 9, the objects 801, 802, 803, 804, 805, 806, 807, 808, 809, 810, 811, 812, 813 are the graphical objects in the intermediate format sent from the printer driver software module and stored in the self-retained display list as described above. The objects 801, 802, 803, 804, 805, 806, 807, 808, 809, 810, 811, 812, 813 are drawn on the page 800 in the same order as the objects 801, 802, 803, 804, 805, 806, 807, 808, 809, 810, 811, 812, 813 are numbered. For example, an object with a smaller number (e.g., the object 801) is rendered on the page 800 below an object with a higher number (e.g., the object 802). The objects (e.g., 801, 802) are rendered using a suitable compositing algorithm and the smaller numbered object (e.g., 801) as compositing background. In the example of FIGS. 8A to 9:

objects 801, 804, 805, 807, 811, 812, which are shaded in FIG. 8A, are printer-incompatible graphical objects;

All other graphical objects of the page 800 (i.e. object 802, 803, 806, 808, 809, and 813) are printer-compatible graphical objects which are also fully opaque;

object 809 is a non-scaled image object that is larger than the predefined big_image_max_scaled_size with zero (0) scaling factor, which is less than the pre-defined big_image_max_scaled_factor; and all objects other than object 809 are not image objects.

In accordance with the described methods, the printer-compatible graphical objects are not necessarily fully opaque. However, the objects (i.e., object 802, 803, 806, 808, 809, and 813) in the example of FIG. 8A are set as fully opaque for ease of explanation.

The page 800 has been assigned numbers and letters in both the X and Y co-ordinate direction for the purpose of naming the grided regions as presented in FIG. 8A. Starting from the left top corner of the page 800, the names of the regions are: r(1A), r(1B) . . . r(1N), r(2A), r(2B), . . . r(21N). An example of a region_set combined by regions r(1A), r(1B), r(2A), r(2B) is referred to as "rs(1A, 2B)", with (num_total_regions=4 & num_dirty_regions=0).

The pre-defined merge_threshold in the example of FIGS. 8A to 9 is set to 80%. Regions of the page 800 touched by each graphical object, as determined at step 209 of the method 200 (i.e., in accordance with the method 400), are as follows:

Object 801: r(3B), r(3C), r(3D), r(3E), r(3F);

Object 802: r(2C), r(2D), r(2E), r(3C), r(3D), r(3E), r(4C), r(4D), r(4E);

Object 803: r(2K), r(2L), r(2M), r(3J), r(3K), r(3L), r(3M), r(4J), r(4K), r(4L), r(4M), r(5K), r(5L), r(5M);

Object 804: r(3K), r(4J), r(4K), r(4L);

Object 805: r(3L), r(3M), r(3N), r(4M);

Object 806: r(6E), r(6F), r(7E), r(7F), r(8E), r(8F);

Object 807: r(7F), r(7G), r(7H), r(8E), r(8F), r(8G), r(8H), r(8I), r(9F), r(9G), r(9H);

Object 808: r(8G), r(8H), r(8I), r(9G), r(9H), r(9I), r(10G), r(10H), r(10I), r(11G), r(11H), r(11I);

Object 809: r(13B) to r(13M), r(14B) to r(14M), r(15B) to r(15M), r(16B) to r(16M), r(17B) to r(17M), r(18B) to r(18M), r(19B) to r(19M), r(20B) to r(20M), r(21B) to r(21M);

Object 810: r(16F) to r(16J), r(17F) to r(17J), r(18F) to r(18J);

Object 811: r(15E), r(16D), r(16E), r(17D), r(17E), r(17F);

Object 812: r(16I) to r(16L), r(17I) to r(17L);

Object 813: r(17H), r(17I), r(18H), r(18I);

At the beginning of the method 200, the dirty status flag of each of the regions of the page 800 are set to FALSE. When the object 801 is received by the processor 105 at step 207 of the method 200, the touched regions determined at step 209 are r(3B), r(3C), r(3D), r(3E) and r(3F). Since object 801 is a printer-incompatible object, at step 211 of the method 200 (i.e., at step 360 of the method 300), the dirty flags of regions r(3B), r(3C), r(3D), r(3E) and r(3F) are set to be TRUE.

Then at step 212 of the method 200, the method 200 returns to step 209 to get the next intermediate graphical object from the self-retained display list (i.e., as sent from the printer driver software module).

When object 802 is received by the processor 105, the touched regions determined at step 209 include region r(3D), which was set to be dirty in the processing of object 801. At step 350 of the method 300, since object 802 is not an image object, the method 300 proceeds to step 370 where the processor 105 stores the object 802 in printer-recognizable format in the memory 106 for printing by the rendering engine software module, for example. At step 375 of the method 300, since object 802 is a fully opaque printer-compatible object, and region r(3D) is fully covered by object 802, the processor 105 sets the dirty flag of region r(3D) back to be FALSE. Then the method 200 returns to step 209 to get the next intermediate graphical object from the self-retained display list (i.e., as sent from the printer driver software module).

When the object 803 is received by the processor 105, since the object 803 is a non-image printer-compatible object, the processor 105 stores the object 803 in printer-recognizable format in the memory 106 (as at step 370) for printing by the rendering engine software module. The method 200 then returns to step 209 to get a next intermediate graphical object from the self-retained display list (i.e., as sent from the printer driver).

When the object 804 and object 805 are received by the processor 105 at step 207 of the method 200, the touched regions determined at step 209 are r(3K), r(4J), r(4K), r(4L), r(3L), r(3M), r(3N) and r(4M). Since object 801 is a printer-incompatible object, at step 211 of the method 200 (i.e., at step 360 of the method 300), the dirty flags of the regions r(3K), r(4J), r(4K), r(4L), r(3L), r(3M), r(3N) and r(4M) are set to be TRUE. Then at step 212 of the method 200, the method 200 returns to step 209 to get the next intermediate graphical object from the self-retained display list configured within the memory 106.

When object 806 is received by the processor 105 at step 207 of the method 200, since the object 806 is a non-image printer-compatible object, the processor 105 stores the object 806 at step 370 in printer-recognizable format in the memory 106 for printing by the rendering engine software module, for example. The dirty flags of the regions that are touched by object 806 are not changed. The method 200 then returns to step 209 to get the next intermediate graphical object from the self-retained display list configured in the memory 106.

When the object 807 is received by the processor 105 at step 207 of the method 200, the touched regions determined at step 209 are r(7F), r(7G), r(7H), r(8E), r(8F), r(8G), r(8H), r(8I), r(9F), r(9G) and r(9H). Since object 807 is a printer-incompatible object, at step 211 of the method 200 (i.e., at step 360 of the method 300), the dirty flags of the regions r(7F), r(7G), r(7H), r(8E), r(8F), r(8G), r(8H), r(8I), r(9F), r(9G) and r(9H) are set to be TRUE. Then at step 212 of the method 200, the method 200 returns to step 209 to get the next intermediate graphical object from the self-retained display list configured within the memory 106.

When object 808 is received by the processor 105, the touched regions determined at step 209 includes region r(9H), which was set to be dirty in the processing of object 807. At step 350 of the method 300, since object 802 is not an image object, the method 300 proceeds to step 370 where the processor 105 stores the object 808 in printer-recognizable format in the memory 106 for printing by the rendering engine software module, for example. At step 375 of the method 300, since object 808 is a fully opaque printer-compatible object, and region r(9H) is fully covered by object 802, the processor 105 sets the dirty flag of region r(9H) back to be FALSE. Then the method 200 returns to step 209 to get the next intermediate graphical object sent from the self-retained display list (i.e., as sent from the printer driver).

When object 809 is received by the processor 105 at step 207 of the method 200, the touched regions determined at step 209 are r(13B) to r(13M), r(14B) to r(14M), r(15B) to r(15M), r(16B) to r(16M), r(17B) to r(17M), r(18B) to r(18M), r(19B) to r(19M), r(20B) to r(20M), r(21B) to r(21M). Since object 809 is a non-scaled printer-compatible image object that is larger than a predefined big_image_max_scaled_size with zero (0) scaling factor, the result of step 350 is TRUE (i.e., the 'yes' arrow is followed at step 350). The method 300 then proceeds to step 360 and sets dirty status flag of the regions touched by object 809 to be TRUE, without storing the object 809 in memory 106 for subsequent rendering by the rendering engine software module, even though the object 809 is printer-compatible. Then at step 212 of the method 200, the method 200 returns to step 209 to get the next intermediate graphical object from the self-retained display list configured within the memory 106.

When objects 810, 811, 812 and 813 are received by the processor 105 at step 207, since the dirty status flags of the touched regions that are determined at step 209 are all already set to TRUE during processing object 809, the results of step 330 of the method 300 are always TRUE for the process of processing objects 810, 811, 812 and 813. The method 300 skips any further processing and the method 200 returns to step 209 to get the next intermediate graphical object from the self-retained display list configured within the memory 106. Since there are no more objects on the page 800 to be processed at step 212, the method 200 proceeds to step 213 where any regions marked as output incompatible are converted to output compatible regions. At this stage of the example, the dirty status of the regions on the page 800 is as shown in FIG. 8B. In accordance with the example of FIGS. 8A to 9, below is a list of the dirty regions from each row of the page 800:

Row 3: r(3B), r(3C), r(3E), r(3F), r(3K), r(3L), r(3M), r(3N);
Row 4: r(4J), r(4K), r(4L), r(4M);
Row 7: r(7F), r(7G), r(7H);
Row 8: r(8E), r(8F), r(8G), r(8H), r(8I);
Row 9: r(9F), r(9G);
Row 13: r(13B) to r(13M);
Row 14: r(14B) to r(14M);
Row 15: r(15B) to r(15M);
Row 16: r(16B) to r(16M);
Row 17: r(17B) to r(17M);
Row 18: r(18B) to r(18M);
Row 19: r(19B) to r(19M);
Row 20: r(20B) to r(20M);
Row 21: r(21B) to r(21M);

At step 501 of the method 500, the processor 105 first executes the method 600 to merge the dirty regions of the page 800 shown in FIG. 8B to form region_sets.

At step 601 of the method 600, the processor 105 first executes the method 700 to process each row of the regions of the page 800.

At step 710, the processor 105 first gets Row 3 of the regions of the page 800. At step 720, the processor 105 merges regions r(3B) and r(3C) to region_set rs(3B, 3C) with (num_total_regions==2; num_dirty_regions==2).

At step 730, the processor 105 merges regions r(3E) and r(3F) to region_set rs(3E, 3F) with (num_total_regions==2; num_dirty_regions==2).

At steps 740 and 750, the processor 105 tries to merge the region_sets rs(3B, 3C) and rs(3E, 3F) to be rs(3B, 3F) with (num_total_regions==5; num_dirty_regions==4). Since (num_dirty_regions/num_total_regions)==0.8>=merge_threshold (80%), the processor 105 goes to step 760 and stores the rs(3B, 3F) in the memory 106 to be the new region_set for the current row.

At step 730, the processor 105 merges regions r(3K), r(3L), r(3M) and r(3N) to region_set rs(3K, 3N) with (num_total_regions==4; num_dirty_regions==4). At step 740 and 750, the processor 105 tries to merge the region_sets rs(3B, 3F) and rs(3K, 3N) to be rs(3B, 3N) with (num_total_regions==13; num_dirty_regions==8). Since (num_dirty_regions/num_total_regions)~=0.61<merge_threshold (80%), the method 700 proceeds to step 770, does not merge the two candidate region_sets, and uses the rs(3K, 3N) as the next candidate region_set.

At step 730, since there are no more dirty regions on the current row, the method 700 proceeds to step 710 and accesses Row 4 of the regions. At this stage, the result region_sets for Row 3 are: rs(3B, 3F), rs(3K, 3N).

When Row 4 of the regions of page 800 are processed in accordance with the method 700, since there is only one group of adjacent dirty regions on the current row, the result region_sets for Row 4 are: rs(4J, 4M).

Similar to Row 4, after the other rows of the regions of page 800 have been processed, the result region_sets for page 800 are as follows:

Row 3: rs(3B, 3F), rs(3K, 3N);
Row 4: rs(4J, 4M);
Row 7: rs(7F, 7H);
Row 8: rs(8E, 8I);
Row 9: rs(9F, 9G);
Row 13: rs(13B, 13M);
Row 14: rs(14B, 14M);
Row 15: rs(15B, 15M);
Row 16: rs(16B, 16M);
Row 17: rs(17B, 17M);
Row 18: rs(18B, 18M);
Row 19: rs(19B, 19M);
Row 20: rs(20B, 20M);
Row 21: rs(21B, 21M);

After the last row Row 21 of the page 800 is processed in accordance with the method 700, the method 600 proceeds to step 610 to get the region_sets from Row 3, and then gets the region_sets from Row 4 at step 620. At step 630, the processor 105 gets region_sets rs(3B, 3F) from Row 3 and rs(4J, 4M) from Row 4 as two candidate region_sets to be merged.

At step 640 and 650 of the method 600, the processor 105 tries to merge the two candidate region_sets rs(3B, 3F) and rs(4J, 4M) to be rs(3B, 4M) with (num_total_regions==24; num_dirty_regions==11). Since (num_dirty_regions/num_total_regions)~=0.46<merge_threshold (80%), the method 600 proceeds to step 660, does not merge the two candidate region_sets, and scans from left to right, drops region_set rs(3B, 3F), and gets the region_set rs(3K, 3N) as the next candidate region_set.

At steps 640 and 650, the processor 105 tries to merge the two candidate region_sets rs(3K, 3N) and rs(4J, 4M) to be rs(3J, 4N) with (num_total_regions==10; num_dirty_regions==8). Because (num_dirty_regions/num_total_regions)~=0.8>=merge_threshold (80%), the method 600 proceeds to step 670, merges the two candidate region_sets to be the new candidate region_set, and proceeds to step 680 to find the next unprocessed region_set from Row 3 and Row 4 of the page 800. Since there are no more region_sets on rows Row 3 and Row 4, the method 600 goes to step 690 where the processor 105 merges the region_sets from Row 3 and Row 4 to one row as:

Row 3: rs(3B, 3F), rs(3J, 4N);

The method 600 then returns to step 620 to get region_sets on Row 7 as the next row to be merged with the new Row 3 described above. At step 640 and 650, the processor 105 tries to merge the two candidate region_sets rs(3B, 3F) and rs(7F, 7H) to be rs(3B, 7H) with (num_total_regions==40; num_dirty_regions==7). Since (num_dirty_regions/num_total_regions)~=0.18<merge_threshold (80%), the processor 105 does not merge the two candidate region_sets, goes to step 660 and gets the next candidate region_set rs(3J, 4N). Similarly, since the (num_dirty_regions/num_total_regions) is less than the merge_threshold 80%, the processor 105 does not merge the candidate region_sets rs(7F, 7H) and rs(3J, 4N).

At step 680, since there are no more unprocessed region_sets left on Row 3 and Row 7, the method 600 proceeds to step 690. Since there are no merged region_sets, result of the merging is still as follows:

Row 3: rs(3B, 3F), rs(3J, 4N);
Row 7: rs(7F, 7H);

The method 600 then returns to step 620 to get region_sets on Row 8 as the next row to be merged with the Row 7. At steps 640 and 650, the processor 105 tries to merge the two candidate region_sets rs(7F, 7H) and rs(8E, 8I) to be rs(7E, 8I) with (num_total_regions==10; num_dirty_regions==8). Since (num_dirty_regions/num_total_regions)=0.8>=merge_threshold (80%), the method 600 proceeds to step 670, then to step 690 with the result of the new Row 7 as:

Row 7: rs (7E, 8I);

The method 600 then returns to step 620 to get region_sets on Row 9 as the next row to be merged with the new Row 7 as described above. At steps 640 and 650, the processor 105 tries to merge the two candidate region_sets rs(7E, 8I) and rs(9F, 9G) to be rs(7E, 9I) with (num_total_regions==15; num_dirty_regions==10). Since (num_dirty_regions/num_total_regions)~=0.67<merge_threshold (80%), the method 600 proceeds to step 660 and does not merge the two candidate region_sets. At step 690, since there are no merged region_sets, the result of the merging is still as follows:

Row 7: rs (7E, 8I);
Row 9: rs (9F, 9G);

The method 600 then returns to step 620 to get region_sets on Row 13 as the next row to be merged with the Row 9 described above. At step 640 and 650, the processor 105 tries to merge the two candidate region_sets rs(9F, 9G) and rs(13B, 13M) to be rs(9B, 13M) with (num_total_regions==60; num_dirty_regions==14). Because (num_dirty_regions/num_total_regions)~=0.23<merge_threshold (80%), the method 600 proceeds to step 660, does not merge the two candidate region_sets. At step 690, since there are no merged region_sets, the result of the merging is still as follows:

Row 9: rs (9F, 9G);
Row 13: rs (13B, 13M);

The method 600 then returns to step 620 to get region_sets on Row 14 as the next row to be merged with the Row 13 described above. At step 640 and 650, the processor 105 tries to merge the two candidate region_sets rs(13B, 13M) and rs(14B, 14M) to be rs(13B, 14M) with (num_total_regions==24; num_dirty_regions==24). Since (num_dirty_regions/num_total_regions)=1>=merge_threshold (80%), the method 600 proceeds to step 670 then 690 with the result of the new Row 13 as follows:

Row 13: rs (13B, 14M);

Similarly, after processing the last row Row 21 of region_sets, the processor 105 merges all region_sets from Row 13 to Row 21 to be a new Row 13 as follows:

Row 13: rs (13B, 21M);

At step 620, since there are no new rows to be processed, the processor 105 proceeds to step 510. The final result from method 600 is as shown in FIG. 8C. Below is a list of the merged region_sets to be output after the method 600.

Row 3: rs(3B, 3F), rs(3J, 4N);
Row 7: rs (7E, 8I);
Row 9: rs(9F, 9G);
Row 13: rs(13B, 21M);

In another implementation, instead of checking the (num_dirty_regions/num_total_regions) against a predefined threshold, the distance between a dirty region and a clean region is checked against a predetermined distance threshold. If the distance between the dirty candidate region_set and the clean candidate region_set is smaller than the predetermined threshold, then the dirty region and clean region are merged into one region_set.

FIG. 9 shows the output of the example of FIGS. 8A and 8B from the method 500. At step 510, the processor 105 accesses region_set rs(3B, 3F) stored in the memory 106; renders the self-retained display list (SRDL) of the area included in the bounding box of the region_set to an Image 910 at step 520, then outputs the Image 910 to the printing engine software module in printer-recognizable format as at step 530. The method 500 then repeats the steps from step 510, accessing the region_set rs(3J, 4N) stored in the memory 106, rendering and outputting as Image 920; then accessing the region_set rs(7E, 8I) from the memory 106, renders and outputs as Image 930; then accesses the region_set rs(9F, 9G), renders and outputs as Image 940; and accesses the region_set rs(13B, 21M), renders and outputs as Image 950. After all region_sets are rendered and output to the rendering engine software module, the method 200 concludes.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of rendering graphical objects on a page, the method comprising:
    marking a region of the page containing a graphical object as output incompatible based on the graphical object being output incompatible;
    determining a bounding box comprising the marked region and at least one output compatible region, the output compatible region containing at least a portion of an output compatible graphical object;
    determining a proportion of a number of the regions marked as output incompatible to a total number of regions in the bounding box;
    marking said at least one output compatible region within the bounding box as output incompatible if the determined proportion is above a threshold;
    converting the graphical objects in the marked output incompatible region into an output compatible graphical object; and
    rendering the output compatible graphical object.

2. A system for rendering graphical objects on a page, the system comprising:
    a memory for storing data and a computer program;
    a processor coupled to the memory for executing the computer program, the computer program comprising instructions for:
        marking a region of the page containing a graphical object as output incompatible based on the graphical object being output incompatible;
        determining a bounding box comprising the marked region and at least one output compatible region, the output compatible region containing at least a portion of an output compatible graphical object;
        determining a proportion of a number of the regions marked as output incompatible to a total number of regions in the bounding box;
        marking said at least one output compatible region within the bounding box as output incompatible if the determined proportion is above a threshold;
        converting the graphical objects in the marked output incompatible regions into an output compatible graphical object; and
        rendering the output compatible graphical object.

3. An apparatus for rendering graphical objects on a page, the apparatus comprising:
    means for marking a region of the page containing a graphical object as output incompatible based on the graphical object being output incompatible;
    means for determining a bounding box comprising the marked region and at least one output compatible region, the output compatible region containing at least a portion of an output compatible graphical object;
    means for determining a proportion of a number of the regions marked as output incompatible to a total number of regions in the bounding box;
    means for marking said at least one output compatible region within the bounding box as output incompatible if the determined proportion is above a threshold;
    means for converting the graphical object in the marked output incompatible regions into an output compatible graphical object; and
    means for rendering the output compatible graphical object.

4. A non-transitory computer readable medium having a computer program recorded thereon for rendering graphical objects on a page, the computer program comprising:
    code for marking a region of the page containing a graphical object as output incompatible based on the graphical object being output incompatible;
    code for determining a bounding box comprising the marked region and at least one output compatible region, the output compatible region containing at least a portion of an output compatible graphical object;
    code for determining a proportion of a number of the regions marked as output incompatible to a total number of regions in the bounding box;
    code for marking said at least one output compatible region within the bounding box as output incompatible if the determined proportion is above a threshold;

code for converting the graphical objects in the marked output compatible regions into an output compatible graphical object; and
code for rendering the output compatible graphical object.

* * * * *